US012662868B2

(12) United States Patent
Yanagi et al.

(10) Patent No.: US 12,662,868 B2
(45) Date of Patent: Jun. 23, 2026

(54) TAILGATE OPENING AND CLOSING SYSTEM

(71) Applicant: Isuzu Motors Limited, Yokohama (JP)

(72) Inventors: Junichi Yanagi, Fujisawa (JP); Kazuhiko Sakaki, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 273 days.

(21) Appl. No.: 18/129,139

(22) Filed: Mar. 31, 2023

(65) Prior Publication Data

US 2023/0313594 A1 Oct. 5, 2023

(30) Foreign Application Priority Data

Apr. 5, 2022 (JP) ................................ 2022-062805

(51) Int. Cl.
*E05F 15/73* (2015.01)
*E05F 15/79* (2015.01)

(52) U.S. Cl.
CPC .............. *E05F 15/73* (2015.01); *E05F 15/79* (2015.01); *E05Y 2400/45* (2013.01); *E05Y 2400/858* (2013.01); *E05Y 2900/546* (2013.01)

(58) Field of Classification Search
CPC ...... E05F 15/73; E05F 15/79; E05Y 2400/45; E05Y 2400/858; E05Y 2900/546
USPC ............................................................ 701/49
See application file for complete search history.

(56) References Cited

U.S. PATENT DOCUMENTS 10,336,295 B2 * 7/2019 Heller ..................... E05F 15/70
2017/0113652 A1 4/2017 Tokudome
2018/0252017 A1 * 9/2018 Hayashi .................. E05F 15/73
2019/0292838 A1 9/2019 Tokudome
2021/0180390 A1 6/2021 Tokudome

FOREIGN PATENT DOCUMENTS

CN 110023580 7/2019
DE 102016120020 4/2017
DE 102018115581 A1 * 1/2020 .............. E05F 15/73
DE 112018006325 10/2020
JP 2016-196798 11/2016
(Continued)

OTHER PUBLICATIONS

DE102018115581A1 translated copy (Year: 2020).*
JP2017082390A translated copy (Year: 2017).*

*Primary Examiner* — James J Lee
*Assistant Examiner* — Brandon S Lee

(57) ABSTRACT

A tailgate opening and closing system, which includes a control device for controlling an opening and closing device that opens and closes tailgate placed in a rear side portion of a vehicle, and includes a measurement device that is placed in the rear side portion and obtains distance data to an object present behind the rear side portion, in which the control device executes, based on a plurality of the distance data which have been obtained by the measurement device, data processing of identifying an entry motion of the object to a trigger region set in a region apart from the rear side portion within a measurement range of the measurement device and an exit motion of the object from the trigger region, and the control device executes control processing of opening and closing the tailgate based on a combination of the identified entry motion and the exit motion.

9 Claims, 7 Drawing Sheets

(56) References Cited

FOREIGN PATENT DOCUMENTS

| | | | | |
|---|---|---|---|---|
| JP | 2017082390 | A | * | 5/2017 |
| JP | 2018-172877 | | | 11/2018 |
| JP | 2020-128637 | | | 8/2020 |

* cited by examiner

TAILGATE OPENING AND CLOSING SYSTEM

CROSS REFERENCE TO RELATED APPLICATIONS

This application claims the benefit of priority of Japanese Patent Application No. 2022-062805, filed on Apr. 5, 2022, the disclosure of which including the specification, drawings and abstract is incorporated herein by reference in its entirety.

TECHNICAL FIELD

The present disclosure relates to a tailgate opening and closing system, and more particularly, to an opening and closing system for opening and closing, by an opening and closing device, a tailgate placed in a rear side portion of a vehicle.

BACKGROUND ART

It is desired that a tailgate positioned in a rear side portion of a vehicle openable and closeable without the use of a hand when a cargo is put in a load compartment or the cargo is taken out from the load compartment. In this regard, various devices for opening and closing a tailgate in a hands-free manner have been proposed (e.g., Patent Literature (hereinafter, referred to as PTL) 1 and PTL 2).

CITATION LIST

Patent Literature

PTL 1

Japanese Patent Application Laid-Open No. 2016-196798

PTL 2

Japanese Patent Application Laid-Open No. 2020-128637

SUMMARY OF INVENTION

Technical Problem

In the invention described in PTL 1, a predetermined motion performed by a vehicle operator is detected from an image of a camera, and a gate is operated from a closed position to an open position. It is essential for this predetermined motion to be an unusual motion that requires a large foot motion, such as a kicking motion, so as to be detectable from the image data by image analysis. However, such an unusual motion may result in an unstable posture and may need to be maintained until the unstable posture is detected. Therefore, in this invention, the tailgate can be opened at an intended timing, but the vehicle operator is forced to perform an unusual motion. Further, a person who is limited in the foot motion, such as a user of a walking frame, a walking assistance stick, or a wheelchair, and is unable to perform the unusual motion cannot open the tailgate.

In the invention described in PTL 2, the tailgate is closed when a person moves out outside of a movement range of the tailgate in a case where the same person is determined to be present in the movement rage of the tailgate captured by a camera for a predetermined time. In this invention, the person is not forced to perform an unusual motion as described in PTL 1, but there is a possibility that the tailgate closes at an unintended timing. For example, during an operation of loading a plurality of cargoes into a load compartment, the tailgate closes each time the operator moves outside the capturing range of the camera.

As described above, there is room for improvement in opening and closing a tailgate at an intended timing without forcing an operator to perform an unusual motion. Further, the inventions described in PTLs 1 and 2 both include a tailgate provided with a camera and/or a sensor, and are limited to either one of opening or closing the tailgate. Even when both inventions are combined, the operation for opening the tailgate and the operation for closing the tailgate are different from each other, which complicates the opening and closing control of the tailgate and even possibly confuses the operator when opening and closing the tailgate, thus being disadvantageous in operability. There is also room for improvement in this respect.

An object of the present disclosure is to provide a tailgate opening and closing system that can open and close a tailgate at a timing intended by an operator with a simple operation.

Solution to Problem

A tailgate opening and closing system of an embodiment of the present disclosure achieving the above object includes, in the tailgate opening and closing system including a control device for controlling an opening and closing device that opens and closes a tailgate placed in a rear side portion of a vehicle, a measurement device that is placed in the rear side portion and at a position lower than the tailgate in a closed state and sequentially obtains distance data to an object present behind the rear side portion, in which the control device executes, based on a plurality of the distance data which are continuous and which have been obtained by the measurement device, data processing of identifying an entry motion of the object to a trigger region set in a region apart from the rear side portion within a measurement range of the measurement device and an exit motion of the object from the trigger region, and the control device executes control processing of opening and closing the tailgate by the opening and closing device based on a combination of the entry motion and the exit motion that have been identified.

Advantageous Effects of Invention

According to an aspect of the present disclosure, an entry motion to a trigger region and an exit motion from the trigger region are easily established by a motion of walking or stepping on a foot, or a forward or backward motion of a walking frame, a walking assistance stick, a wheelchair, or the like. Further, combining the entry motion to the trigger region and the exit motion from the trigger region makes it possible to utilize a motion having regularity as a signal for opening and closing. Therefore, according to an aspect of the present disclosure, the tailgate can be opened and closed at a timing intended by an operator with a simple motion.

DESCRIPTION OF EMBODIMENTS

Figure 1:
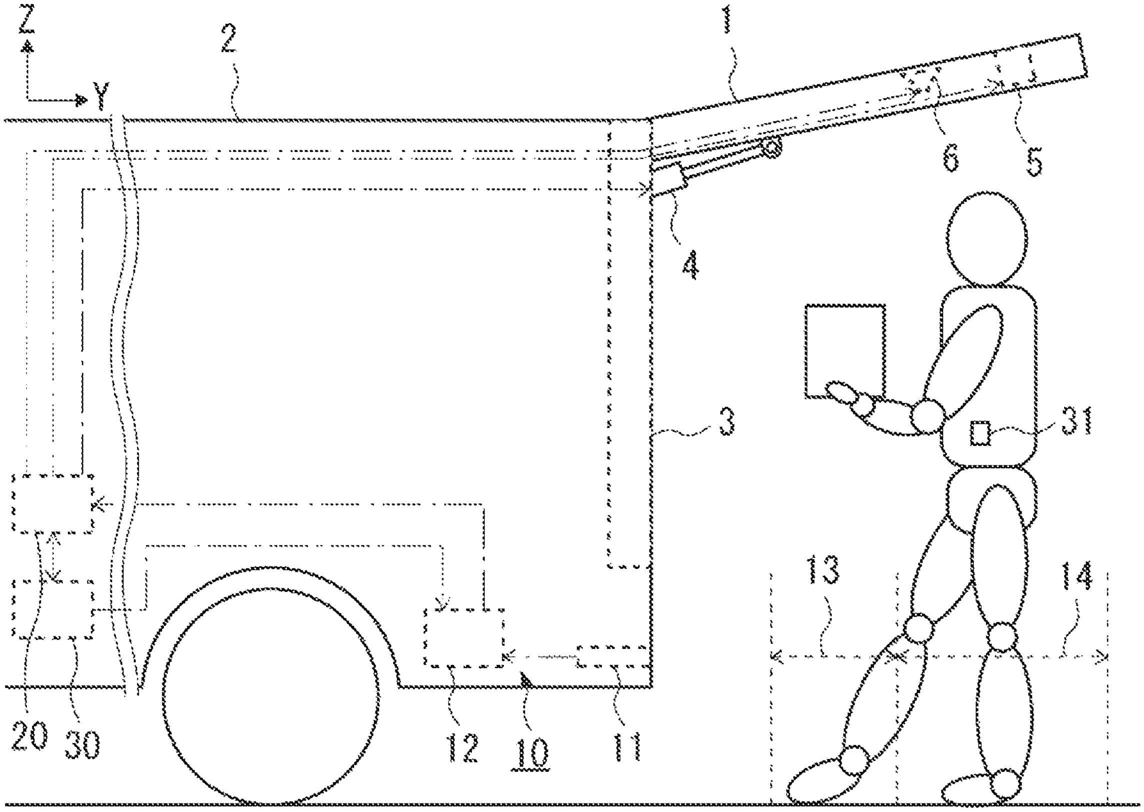
FIG. 1 is an explanatory diagram illustrating an embodiment of a tailgate opening and closing system.

Hereinafter, a tailgate opening and closing system will be described based on an embodiment illustrated in the drawings. In the drawing, the left and right direction (width direction) of vehicle 2 is illustrated as X direction, the front and rear direction (forward and backward direction) of vehicle 2 is illustrated as Y direction, and the vertical direction is illustrated as Z direction. Note that in the present disclosure, the operator who operates the opening and closing of tailgate 1 illustrated in FIG. 1 is a driver of vehicle 2. Further, it is assumed that the operator carries portable device (FOB key) 31 for locking and unlocking doors and the like of vehicle 2 including tailgate 1 by wireless communication.

Tailgate 1 illustrated in FIG. 1 is placed in rear side portion 3 of vehicle 2. Tailgate 1 may be configured to be opened and closed by drive of opening and closing device 4, and various known electric tailgates (power tailgates) can be used. Locking device 5 and notification device 6 are placed in tailgate 1. Examples of notification device 6 include a sound generator and a light-emitting device capable of notifying an operator of an opened and closed state of tailgate 1.

The embodiment of opening and closing system 10 is a system that operates any one of the following three operations in accordance with the opened and closed state of tailgate 1: an opening operation of tailgate 1; a closing operation of tailgate 1; and stopping of the opening and closing operations. Opening and closing system 10 includes measurement device 11 and control device 12. Opening and closing system 10 performs, by control device 12, data processing of identifying an entry motion of the operator to trigger region 13 and an exit motion of the operator from trigger region 13 based on a plurality of continuous data obtained by measurement device 11, and control processing of opening and closing tailgate 1 by opening and closing device 4 based on a combination of the entry motion and the exit motion.

The entry motion and the exit motion are motions completed with a simple motion, such as walking of the operator, stepping forward on a foot, or returning of the stepped foot to the rear side. Further, the entry motion and the exit motion are motions that even a person who has difficulty in motions such as walking and stepping on a foot (e.g., wheelchair user) can perform. That is, the entry motion and the exit motion are motions by which the operation does not take an unstable posture because the motion is completed even when both feet of the operator are on the ground; therefore the motion can be a barrier-free motion.

When a target of distance data of measurement device 11 is a foot of the operator, a combination of the entry motion and the exit motion is determined by the motion of the foot of the operator. Such a combination of the entry motion and the exit motion by the motion of the foot of the operator is hereinafter referred to as a step motion. In the following description, a configuration in the present embodiment will be described in which control device 12 identifies a step motion in data processing, and the opening and closing operation of tailgate 1 is performed in control processing based on the step motion.

Measurement device 11 sequentially obtains distance data indicating a distance to an object present behind the rear side portion 3 in the Y direction. Various known distance meters such as an ultrasonic sensor, a two-dimensional scanning optical range sensor, and a three-dimensional range measurement sensor can be used for measurement device 11. Measurement device 11 is placed in rear side portion 3 at the position lower than the lower end of tailgate 1 in a closed state. Besides tailgate 1, a rear bumper, a tail lamp, a direction indicator (turn lamp), and the like (not illustrated) are placed in rear side portion 3, but it is desired that measurement device 11 be placed in the rear bumper. Placing measurement device 11 in rear side portion 3 at the position lower than the lower end of tailgate 1 allows measurement device 11 to perform measurement regardless of the opening and closing of tailgate 1. Further, it is possible to specify a foot of the operator as the target for distance data of measurement device 11 by placing measurement device 11 in the rear bumper placed in the lower side of rear side portion 3.

Various known computers can be used for control device 12. Control device 12 includes a central processing unit, a main storage unit, an auxiliary storage unit, and an input/output unit. Control device 12 is connected to measurement device 11, opening and closing control device 20, and body control device 30 via the input/output unit. Similarly to control device 12, various known computers are used for opening and closing control device 20 and body control device 30. Opening and closing control device 20 controls opening and closing device 4, locking device 5, and notification device 6. Body control device 30 is a control device that is a higher-level control device than opening and closing control device 20, and manages and controls locking and unlocking of all doors and the like of vehicle 2 including tailgate 1. Body control device 30 can wirelessly communicate with portable device 31 carried by the operator. Body control device 30 receives unique information of portable device 31 to authenticate the unique information, and manages and controls the locking and unlocking of the doors and the like of vehicle 2 including tailgate 1. Control device 12 is controlled by body control device 30 for turning on and off its own power.

Figure 2:
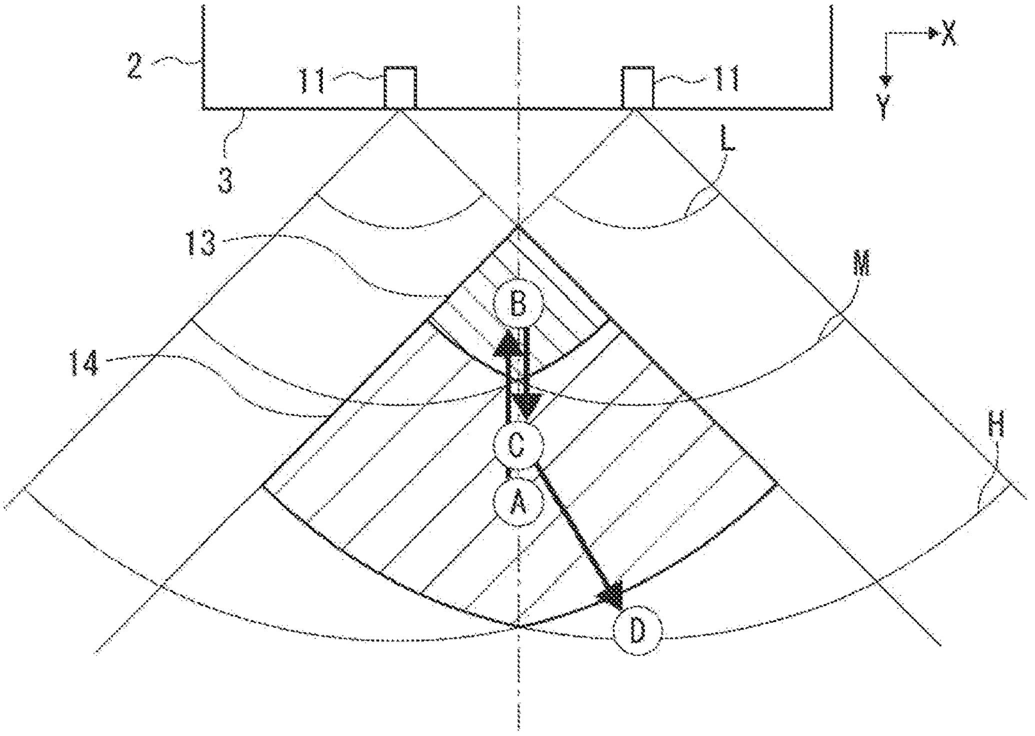
FIG. 2 is an explanatory diagram illustrating measurement devices in FIG. 1 and a center mode of a trigger region.
Figure 3:
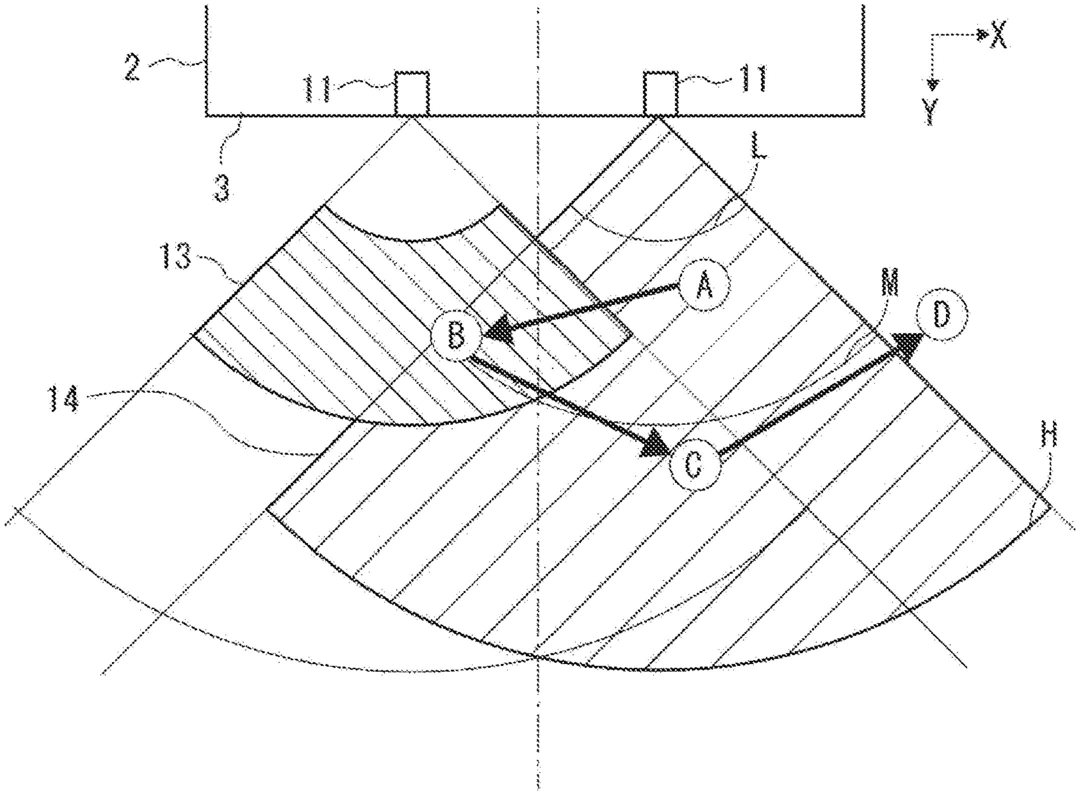
FIG. 3 is an explanatory diagram illustrating measurement devices in FIG. 1 and a left and right mode of the trigger region.
Figure 4:
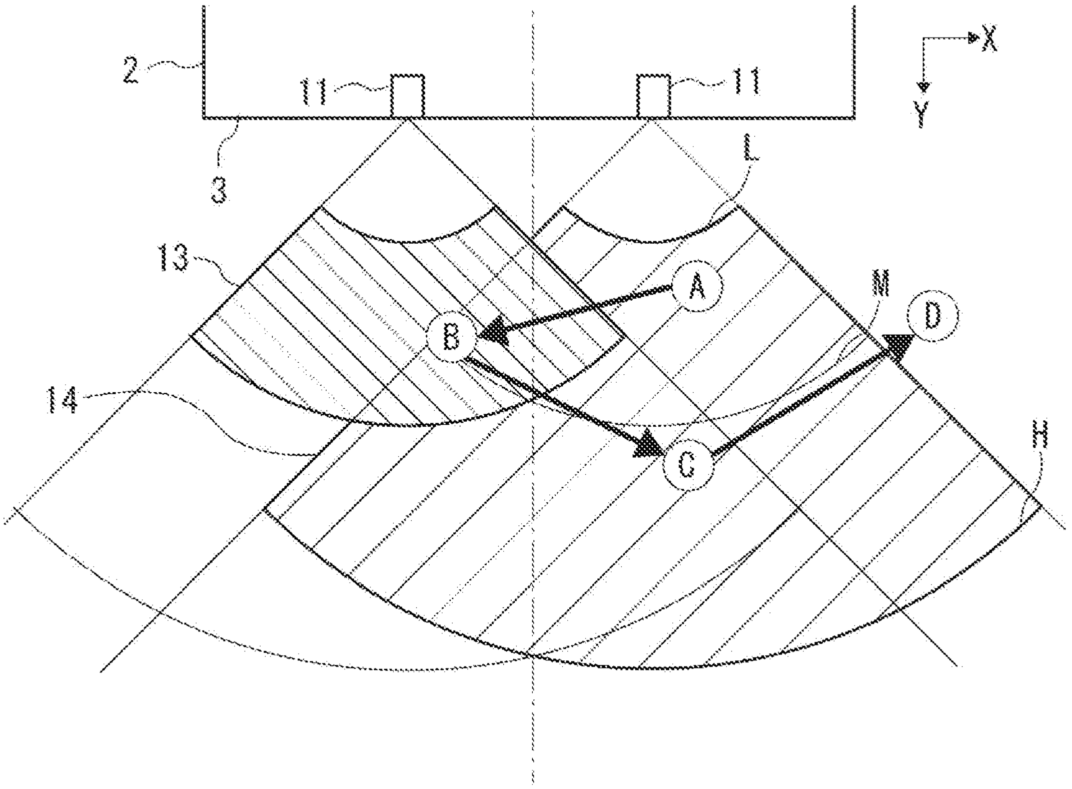
FIG. 4 is another explanatory diagram illustrating measurement devices in FIG. 1 and the left and right mode of the trigger region.

FIG. 2 to FIG. 4 illustrate more specific examples of measurement device 11. Further, exemplary trigger region 13 used for data processing executed by control device 12 is also illustrated.

Measurement device 11 may be configured with a single distance meter, but it is desired to be configured with a plurality of distance meters aligned in the X direction of rear side portion 3. More specifically, it is desired that measurement device 11 be configured with two distance meters arranged on the left and right sides, respectively, across a center line (a dashed-dotted line in the drawings) in the X direction of vehicle 2. When measurement device 11 is configured with a single distance meter, only the motion of the operator in the Y direction can be grasped, but when measurement device 11 is configured with a plurality of distance meters arranged in the X direction, the motion of the operator in the X direction can also be grasped by performing data processing on distance data of each of the distance meters. This makes it possible to utilize an area placed behind rear side portion 3 more widely, thereby increasing convenience. Further, grasping the motion of the operator in the X direction makes it possible to distinguish between the step motion of the operator and the motion performed by a person other than the operator. Examples of the motion performed by a person other than the operator include a motion in which a person other than the operator passes behind rear side portion 3 or the like. Configuring measurement device 11 with a plurality of distance meters can prevent a malfunction of tailgate 1.

In the embodiment, measurement device 11 is configured with two ultrasonic sensors. When measurement device 11 is configured with a plurality of distance meters, the distance data includes distance data measured by each of the plurality of distance meters. Further, when measurement device 11 is configured with a plurality of distance meters, the lengths of measurement cycles (sampling cycles) of the plurality of respective distance meters are the same. The measurement cycles may be synchronized with each other, but it is desired that the cycles be not synchronized and the timing at which the distance data is measured be different between distance meters. In the case of two ultrasonic sensors, it is desired that the measurement cycles be not synchronized and the ultrasonic waves be alternately oscillated. Setting the measurement periods of the plurality of respective distance meters as asynchronous as described above increases measurement continuity of the distance data, which is advantageous to the identification of the motion based on the distance data.

The measurement range in which the distance data of the distance meter can be measured faces, when viewed in the Z direction, toward the rear side of vehicle 2 and forms a sector shape whose center is positioned at the rear end of the distance meter. It is desired that measurement ranges of the plurality of respective distance meters overlap with each other in the vicinity of the center line of vehicle 2, and it is further desired that the shape of the overlapped part be left-right symmetric with respect to the center line. The length between the plurality of distance meters and the center angle of the sector of each measurement range can be appropriately selected within a range in which measurement ranges overlap with each other. Adjusting the length between the plurality of distance meters and the center angle of each measurement range makes it possible to adjust the separation distance of trigger region 13 or start region 14 from rear side portion 3 and the width of each region in the X direction. The measurement range of the distance meter when viewed in the X direction is not particularly limited as long as at least a foot of the operator is the measurement target. Note that, for the distance data of the distance meter, data of the outside of the measurement range are all set to a constant value. It is preferred that the constant value be equal to long distance H to be described later.

Trigger region 13 and start region 14 are specific areas stored in the main storage unit and/or the auxiliary storage unit of control device 12, and are set at positions spaced rearward from rear side portion 3 within the measurement range of measurement device 11. Trigger region 13 and start region 14 are set based on short distance L, middle distance M, and long distance H, which are distances from the rear end of the distance meter. Short distance L is the shortest, long distance H is the longest, and middle distance M is the length between short distance L and long distance H. It is desired that the region between short distance L and middle distance M be a region where the operator can operate locking device for manually opening and closing tailgate 1, and the region between middle distance M and long distance H be a region in which the operator does not contact with tailgate 1 to be opened and closed.

Trigger region 13 and start region 14 have three modes having different arrangements and shapes from each other, and the switching between the modes is based on the difference between the distance data of the two distance meters. The three modes are sorted into a center mode (see FIG. 2) in which the regions are arranged in the Y direction and a left mode or a right mode (see FIG. 3 and FIG. 4) in which the regions are arranged in the X direction. FIG. 3 and FIG. 4 illustrate the right mode, and the illustration of the left mode is omitted because the left mode is a state where FIG. 3 and FIG. 4 are reversed left and right. The difference in the distance data is a value obtained by subtracting the distance data of one distance meter from the distance data of the other distance meter. When the difference in the distance data is within a range from a negative mode reference value to a positive mode reference value (however, including the negative mode reference value and the positive mode reference value), the center mode is set, and when the difference in the distance data is less than the negative mode reference value or more than the positive mode reference value, the left mode or the right mode is set. The mode reference value can be appropriately set based on the overlap of the measurement ranges of the two distance meters, but it is preferred that the value be set based on the overlap of the measurement ranges of the two distance meters.

Trigger region 13 of the center mode illustrated in FIG. 2 is a region where measurement ranges of the two distance meters overlap with each other. Each of the measurement regions forms an annular sector shape having short distance L or greater and less than middle distance M. Start region 14 of the center mode is a region where measurement ranges of the two distance meters overlap with each other. Each of the measurement regions forms an annular sector shape having middle distance M or greater and long distance H or less. In the center mode, start region 14 and trigger region 13 are arranged in this order from the rear side toward the front side in the Y direction, and the area of start region 14 is larger than that of trigger region 13.

Trigger region 13 of the right mode illustrated in FIG. 3 is a measurement range of one distance meter forming an annular sector shape having short distance L or greater and less than middle distance M. Start region 14 of the right mode is a region of the measurement range of the other distance meter forming an annular sector shape having long distance H or less, and the region overlapping with trigger region 13 is eliminated from the measurement range. In the right mode, start region 14 and trigger region 13 are arranged in this order from the right side toward the left side in the X direction, and the area of start region 14 is larger than that of trigger region 13.

Start region 14 of the right mode illustrated in FIG. 4 is a region obtained by eliminating the region overlapping with trigger region 13 from the region of the measurement range of the other distance meter forming an annular sector shape having short distance L or greater and long distance H or less. As described above, the range of start region 14 can be changed in the left and right modes. Further, in the left and right mode, the right mode illustrated in FIG. 3 may be used for the entry motion from start region 14 to trigger region 13, and the right mode illustrated in FIG. 4 may be used for the exit motion from trigger region 13 to start region 14.

For switching between the center mode and the left and right mode, it is preferred to determine a still or motion state of the detection object based on the distance data obtained by measurement device 11 and to switch to the left and right mode when the detection object is in a still state. For example, regarding the detection object, when a wall exists behind a vehicle parked in a parking lot, measurement device 11 detects the wall as a detection object and may switch to the left and right mode because the detection object is in a still state. As described above, switching between the center mode and the left and right mode based on the still or motion state of the detection object makes it possible to open and close tailgate 1 by switching to the left and right mode when a wall exists behind the vehicle, the access from the rear side of the vehicle is impossible, and thus the opening and closing of tailgate 1 cannot be performed in the center mode.

A motion reference value is used for the identification of the step motion based on the plurality of continuous distance data obtained by measurement device 11. For example, in the case of the center mode, among the plurality of continuous distance data of each of left and right distance meters, distance data at the timing when a displacement in the plurality of distance data is equal to or more than the motion reference value is distance data of the end point of the step motion. Further, in the case of the right mode, among the plurality of continuous distance data of the left distance meter, distance data at the timing when displacement in the plurality of distance data is equal to or more than the motion reference value is distance data of the end point of the step motion. Note that, because the distance data of the distance meter of the outside of the measurement range is treated as a constant value, when the distance data is a predetermined value before the displacement is equal to or larger than the motion reference value, the constant value is the distance data of the end point of the step motion. The end point of the step motion is also the start point of the next step motion. The motion reference value can be configured as appropriate, but it is desired that the value be a length of trigger region 13 in the Y direction, that is, a value equal to or less than the difference between short distance L and middle distance M.

There are a number of combinations of the entry motion to trigger region 13 and the exit motion from trigger region 13. A permission pattern of the combination for executing control processing is required to be a simple pattern. Therefore, it is desired for the permission pattern that the number of motions of the entry motion and the exit motion be two or more and six or less.

Further, it is desired that the identified order of the entry motion and the exit motion be used as a condition for the permission pattern. The permission pattern of the present embodiment is satisfied only in the case of the combination identified in the order of the entry motion and the exit motion, and is not satisfied in other cases. Therefore, the combination in the case of identifying, after identifying the entry motion from start region 14 to trigger region 13, the exit motion from trigger region 13 to the area other than start region 14 does not match with the permission pattern. The permission pattern may be a pattern based on the identified order of the entry motion and the exit motion, and is not limited to a pattern in which the exit motion is identified after the entry motion is identified. For example, the permission pattern may be a pattern in which the entry motion is identified after the exit motion is identified. Further, the pattern may be a pattern in which the exit motion is repeated a plurality of times after the entry motion is identified. Further, the permission pattern may be appropriately adjustable by the driver of vehicle 2. However, the permission pattern exemplified in the present embodiment is a pattern with a small number of motions among patterns having regularity, which makes the step motion simpler and is advantageous to enhance the operability of opening and closing tailgate 1.

FIG. 2 to FIG. 4 illustrate exemplary step motions (A to D) that match with the permission pattern. The letter “A” represents an entry motion to start region 14, the letter “B” represents an entry motion from start region 14 to trigger region 13, the letter “C” represents an exit motion from trigger region 13 to start region 14, and the letter “D” represents an exit motion from start region 14. An identified order of the entry motions and the exit motions is used as a condition for this permission pattern (step motion from A to D), and the order of identifying entry motion (B) first and then identifying exit motion (C) is the order for the condition.

The permission pattern may be configured with two motions: entry motion (B) to trigger region 13; and exit motion (C) to trigger region 13, using only trigger region 13. However, by the method using only trigger region 13, the permission pattern is satisfied even by the entry motion from the front of trigger region 13 or the motion of passing trigger region 13 in the X direction, which results in executing the opening and closing control. As described above, when the permission pattern is satisfied with a simple motion, the opening and closing control is executed even by a small motion of a person, an animal, or an object other than the operator, and the opening and closing operation frequently occurs. Therefore, it is desired that the permission pattern be configured with the following four motions using two regions of trigger region 13 and start region 14: entry motion (A) to start region 14; entry motion (B) from start region 14 to trigger region 13; exit motion (C) from trigger region 13 to start region 14; and exit motion (D) from the start region. As described above, using the two regions of trigger region 13 and start region 14 allows the permission pattern to be easily satisfied while being more complicated, and thus is advantageous to avoid performing opening and closing operations of tailgate 1 at an unexpected timing. In the following data processing steps, the permission patterns illustrated in FIGS. 2 to 4 will be used.

Figure 5:
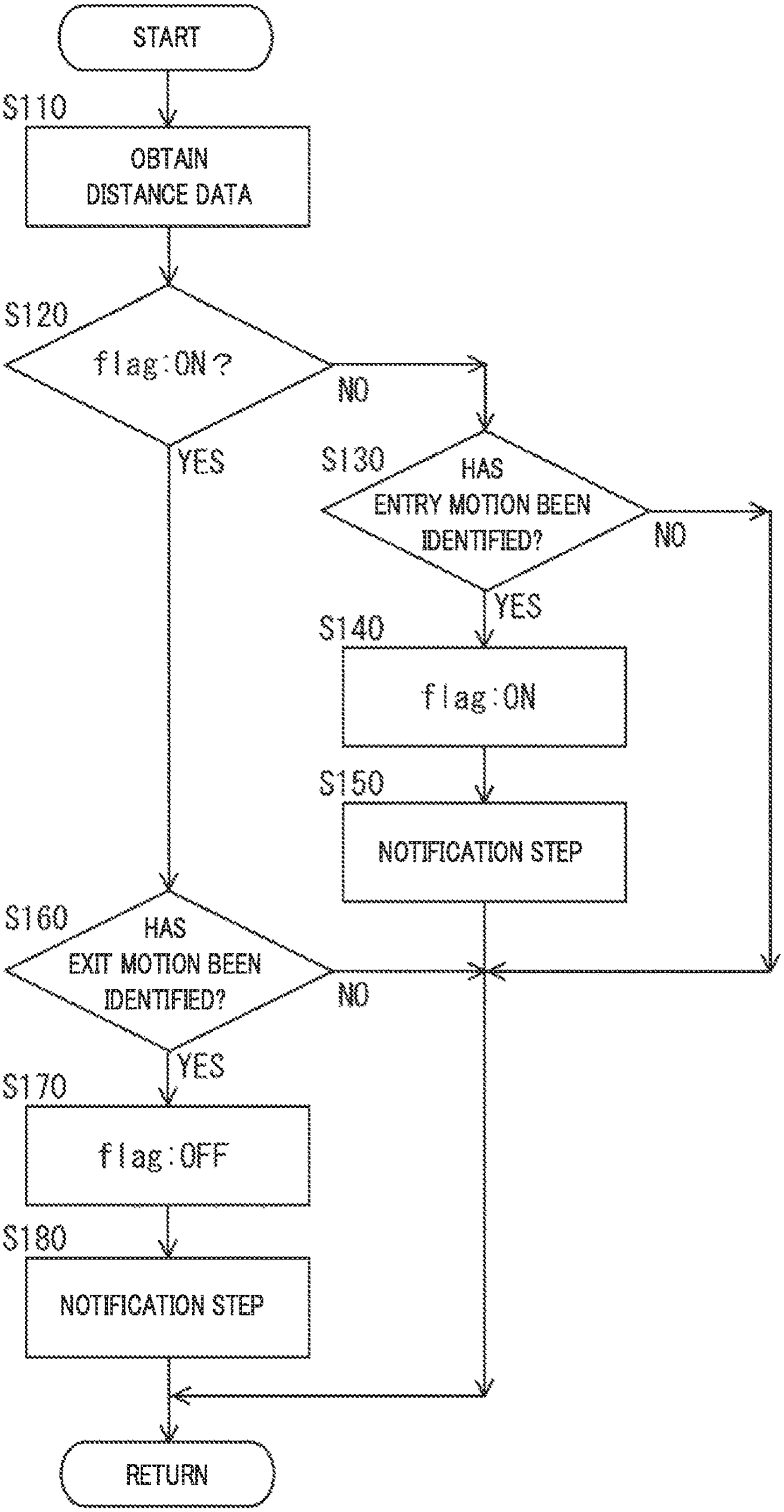
FIG. 5 is a flow chart illustrating a data processing method in a tailgate opening and closing method.

FIG. 5 illustrates exemplary data processing steps in the opening and closing method of tailgate 1. First, body control device 30 determines whether the condition for permitting energization to control device 12 is satisfied, and when it is determined that the condition is satisfied, the energization to control device 12 is started to start the opening and closing method. Then, measuring device 11 obtains distance data (S110). Then, based on a plurality of continuous data obtained by measurement device 11, data processing (S120 to S180) of identifying an entry motion and an exit motion are each performed. Based on the step motion identified by the data processing, opening and closing processing of opening and closing tailgate 1 by opening and closing device 4 is performed. In the following, the contents of the step of permitting energization to control device 12 and each step of (S110 to S180) will be described in detail.

Before starting the opening and closing method, in a step of permitting energization to control device 12, body control device 30 determines whether the predetermined condition is satisfied. The energization to control device 12 is permitted when body control device determines that the condition is satisfied, and the energization to control device 12 is not permitted when body control device 30 determines that the condition is not satisfied. The condition for permitting the energization is satisfied when unique information that portable device 31 owns is authenticated in a state where it is confirmed that vehicle 2 does not start. For example, in a case where portable device 31 is outside vehicle 2, the condition is satisfied when body control device 30 authenticates unique information of portable device 31 placed outside vehicle 2. Further, when the engine of vehicle 2 is running, the condition is satisfied when it is confirmed that vehicle 2 does not start. The state in which the engine of vehicle 2 is running is a state after the unique information of portable device 31 is already authenticated. The state of vehicle 2 not starting can be confirmed with the shift lever being in the P range or the side brake being activated in the case of an automatic transmission vehicle, and the shift lever being in the N range in the case of a manual transmission vehicle. Even when the condition for permitting the energization is satisfied, it is preferred that the energization to control device 12 be stopped when the brake pedal is depressed. Note that the condition for permitting the energization can be appropriately changed on the assumption that the safety is ensured even when tailgate 1 is opened and closed in a state where the security of vehicle 2 is ensured.

In step (S110) of obtaining the distance data, the distance data is obtained by measurement device 11. More specifically, the two distance meters of measurement device 11 measure the distance data in asynchronous measuring cycles alternately. The operation state of measurement device 11 need not always be constant, and may be changed in accordance with the state of vehicle 2 or the moving state of the object behind rear side portion 3. For example, during a predetermined period after the energization to control device 12 is permitted, measurement device 11 operates in a predetermined measurement cycle, and when the distance data cannot be obtained until the predetermined period elapses, measurement device 11 operates in a cycle slower than the measurement cycle. In addition, when vehicle 2 starts or when the off-state of an accessory power supply of vehicle 2 continues for longer than a predetermined period, measurement device 11 is put into a dormant state. This makes it advantageous to reduce the power consumption of opening and closing system 10.

In the data processing steps of step (S120 to S170), control device 12 identifies the entry motion and the exit motion based on the plurality of continuous distance data obtained by measurement device 11, and then executes data processing of checking the motions with the permission pattern. In the data processing steps, a plurality of continuous distance data in a predetermined period may be processed for each predetermined period, or the measured distance data may be processed each time the distance meter measures distance data, and may be eventually checked with the permission pattern based on a plurality of continuous distance data. In the present embodiment, the data processing is performed with the latter method. In the latter method, a flag is set to on (flag: ON) when the entry motion is identified first, and the set flag is set to off (flag: OFF) when the exit motion is identified afterward. More specifically, the permission pattern is a pattern in which the identified order of the entry motion and the exit motion is used as a condition, and, in the flow chart, is a pattern in which (S160: YES) is satisfied after (S130: YES) is satisfied in this order.

In step (S130) of identifying the entry motion, control device 12 executes data processing of identifying the entry motion of the operator to trigger region 13 based on the obtained distance data. More specifically, control device 12 identifies the entry motion of the operator to trigger region 13 after the entry motion of the operator to start region 14 is identified in one of the three modes. In the center mode in FIG. 2, entry motion (A) to start region 14 is identified first. Then, entry motion (B) from start region 14 to trigger region 13 is identified. Similarly, in the right mode in FIG. 3, entry motion (A) to start region 14 is identified. Then, entry motion (B) from start region 14 to trigger region 13 is identified. The direction of entry motion (B) from start region 14 to trigger region 13 is different depending on the mode. In the center mode, the direction is generally from the rear side to the front side in the Y direction, and in the right mode, the direction is generally from the right side to the left side in the X direction. In the step of identifying the entry motion, a flag is set to ON (S140) when the entry motion is identified (S130: YES), and the process proceeds to the next step (S150). When the entry motion is not identified in this step, the process returns to the start.

In notification step (S150), control device 12 executes control processing of causing notification device 6 to notify that the entry motion is identified first, the flag is set to ON, and thus the condition for the permission pattern is partially satisfied. The number of times of blowing or the number of times of blinking of the notification by notification device 6 at this time may be at least one.

In step (S160) of identifying the exit motion, control device 12 executes data processing of identifying the exit motion of the operator from trigger region 13 based on the obtained distance data. More specifically, control device 12 identifies the exit motion from start region 14 after the entry motion of the operator from trigger region 13 to start region 14 is identified in the mode when the entry mode is identified. In the center mode of FIG. 2, exit motion (C) from trigger region 13 to start region 14 is identified. Then, exit motion (D) from start region 14 is identified. Similarly, in the right mode in FIG. 3, exit motion (C) from trigger region 13 to start region 14 is identified. Then, exit motion (D) from start region 14 is identified. The direction of exit motion (C) is generally the opposite direction to the direction of the entry motion, and is generally from the front side to the rear side in the Y direction in the center mode, and is generally from the left side to the right side in the X direction in the right mode. In the step of identifying the exit motion, the flag is set to OFF (S170) when the exit motion is identified (S160: YES), and the process proceeds to the next step. When the exit motion is not identified in this step, the process returns to the start.

In notification step (S180), control device 12 executes control processing of causing notification device 6 to notify that (S160:YES) is satisfied after (S130:YES), that is, that the step motions and the permission pattern match with each other. The number of times of blowing or the number of times of blinking of the notification by notification device 6 at this time may be different from that of the notification process (S150). Thus, the data processing is completed.

In the opening and closing steps, because the combination of the motions identified in the data processing steps and the permission pattern match with each other, control device 12 sends instruction to opening and closing control device 20, and then the control processing for opening and closing tailgate 1 is executed by opening and closing device 4. In this step, any one of three operations of the opening operation of tailgate 1, the closing operation of tailgate 1, and the stopping of the opening and closing operations of tailgate 1 is performed in accordance with the opening and closing state of tailgate 1 before the control process is executed. When the step motion matches with the permission pattern in a state where tailgate 1 is fully closed, tailgate 1 performs an opening operation. When the step motion matches with the permission pattern in a state where tailgate 1 is fully opened, tailgate 1 performs a closing operation. When the step motion matches with the permission pattern during the opening and closing operation of tailgate 1, the opening and closing operation of tailgate 1 is stopped. Note that it is desired that, when opening and closing device 4 opens tailgate 1 based on the step motion, the authentication of portable device 31 be performed after it is confirmed that the step motion matches with the permission pattern. This makes it advantageous to ensure security.

For the permission pattern, only the identified order of the entry motion and the exit motion may be used as a condition, but using only the order as a condition may be insufficient to confirm intention of the operator who operates the opening and closing of tailgate 1. In addition, using only the order as a condition may be insufficient to confirm whether the motion identified as a step motion is a motion actually performed by the operator. Thus, it is desired that at least one of standby time in each region, directions of the entry motion and the exit motion, the ranges of the motions, the distances of the motions, the speed of the motions, and/or the time of the motions be added to the condition of the permission pattern. It is also desired to add the operation of locking device 5 to the conditions. The permission pattern may be a combination of several conditions, but it is more desired to add all of them to the conditions. Details of these conditions will be described below.

Figure 6:
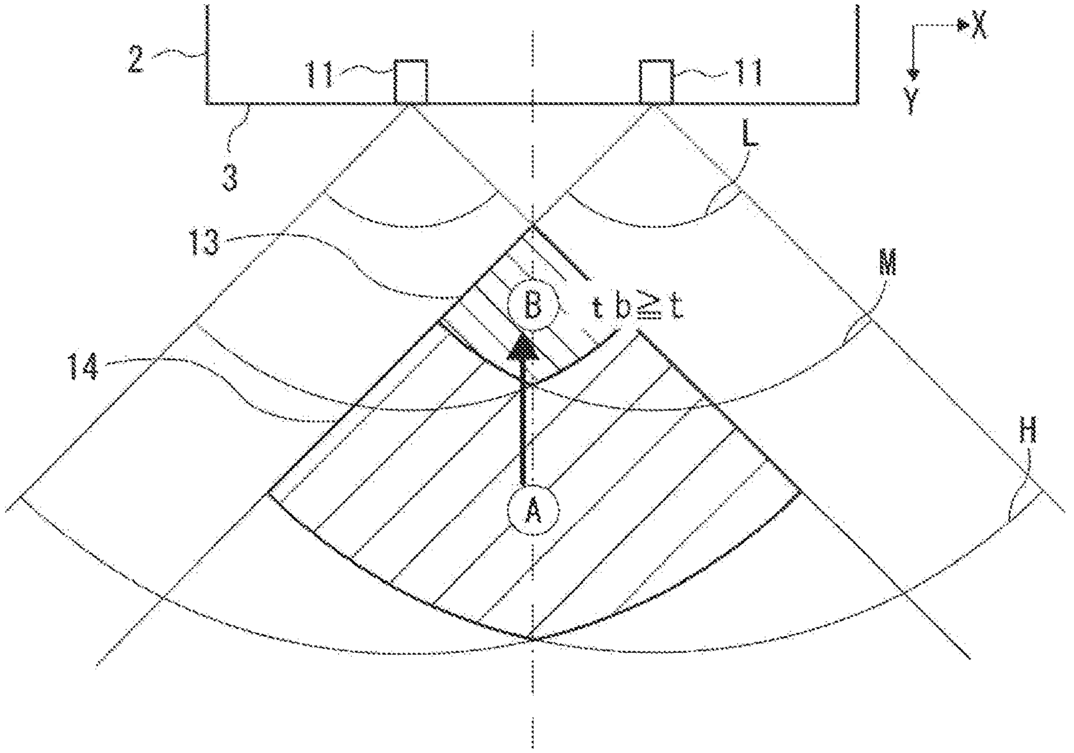
FIG. 6 is an explanatory diagram illustrating a step motion that does not match with a permission pattern.

FIG. 6 is an exemplarily step motion that does not match with the permission pattern when standby time in each region is used as a condition of the permission pattern. In this example, entry motion (B) from start region 14 to trigger region 13 is identified after entry motion (A) to start region 14 in the center mode is identified. Then, it is identified that standby time tb in trigger region 13 has passed for threshold value t or more of the standby time. In this case, it can be considered that there is no intention to open or close tailgate 1, and the step motion does not match with the permission pattern. Such a step motion may be a loading or unloading operation of a cargo while the operator opens tailgate 1. The standby time in each region is not limited to standby time tb in trigger region 13, and may be a standby time in the start region. For example, when it is identified that the standby time in start region 14 has passed for a threshold value or more of the standby time after the entry motion from trigger region 13 to start region 14 is identified, it can be considered that there is no intention to open or close tailgate 1. Standby time threshold value t may be a time period in which the intention to open or close tailgate 1 can be confirmed, and may be a short time period of 5 seconds or less.

Figure 7:
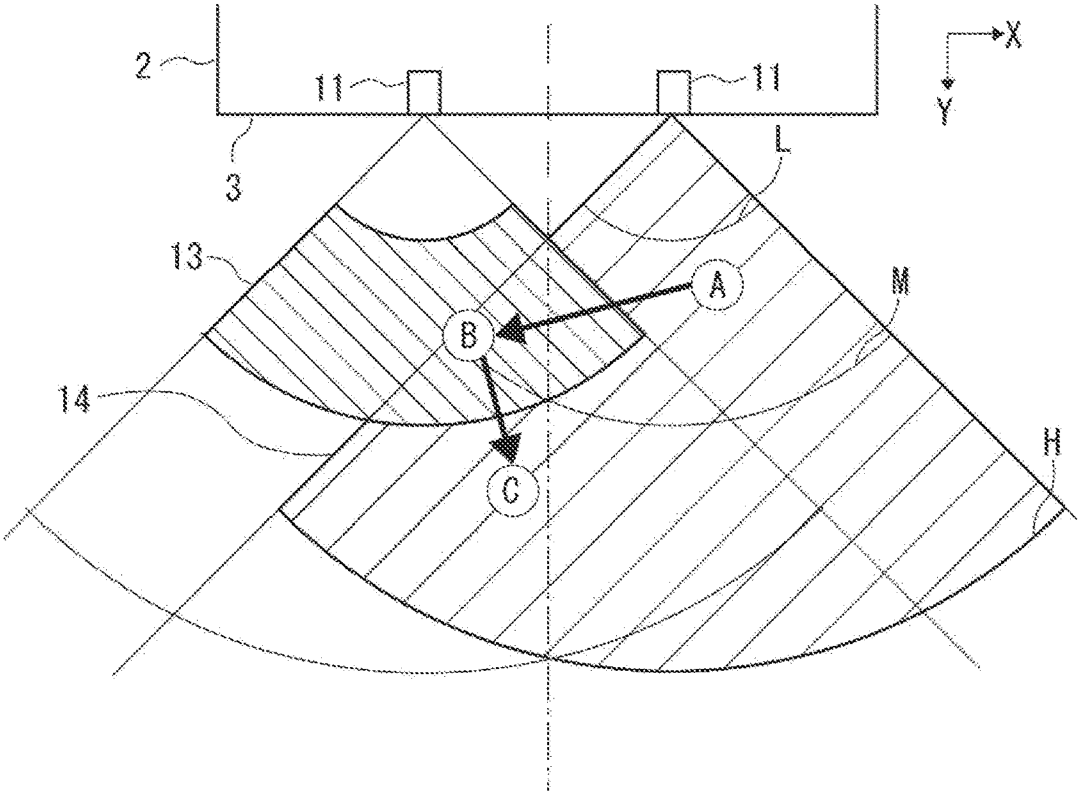
FIG. 7 is another explanatory diagram illustrating the step motion that does not match with the permission pattern.

FIG. 7 is an exemplarily step motion that does not match with the permission pattern when directions of the entry motion and the exit motion are used as a condition of the permission pattern. In this example, entry motion (B) from start region 14 to trigger region 13 is identified after entry motion (A) to start region 14 in the right mode is identified. Then, exit motion (C) from trigger region 13 to start region 14 is identified. Entry motion (B) steps over the center line in the X direction of vehicle 2, and exit motion (C) does not cross the center line. In this case, the step motion does not match with the permission pattern because the directional consistency between the entry motion and the exit motion is low. Such a step motion is considered as crossing behind rear side portion 3.

Figure 8:
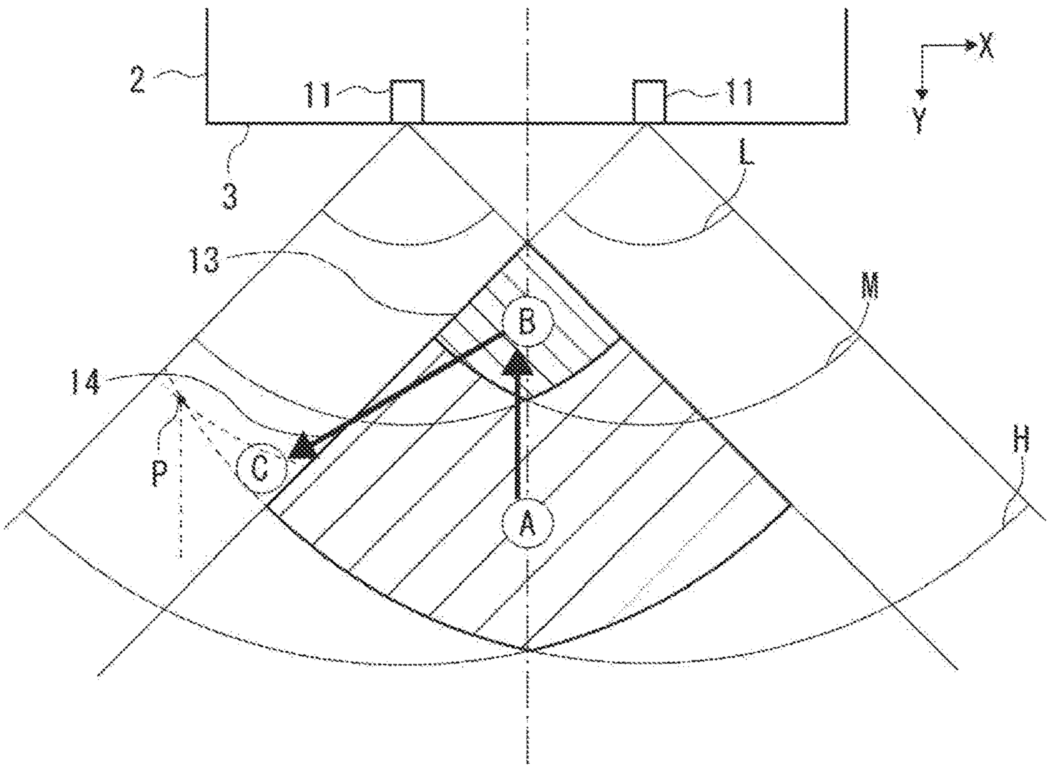
FIG. 8 is still another explanatory diagram illustrating the step motion that does not match with the permission pattern.

FIG. 8 is an exemplarily step motion that does not match with the permission pattern when each motion range of the entry motion and the exit motion is used as a condition of the permission pattern. In this example, entry motion (B) from start region 14 to trigger region 13 is identified after entry motion (A) to start region 14 in the center mode is identified. Then, exit motion (C) from trigger region 13 to start region 14 is identified. Exit motion (C) exceeds the measurement range of the distance meter on the right side. Therefore, the end point of exit motion (C) is intersection point P of the distance data of the left distance meter and a constant value (long distance H). Intersection point P is outside the range of start region 14. In this case, because the motion range of the exit motion is wide, the step motion does not match with the permission pattern. Such a step motion is considered as crossing behind rear side portion 3.

Figure 9:
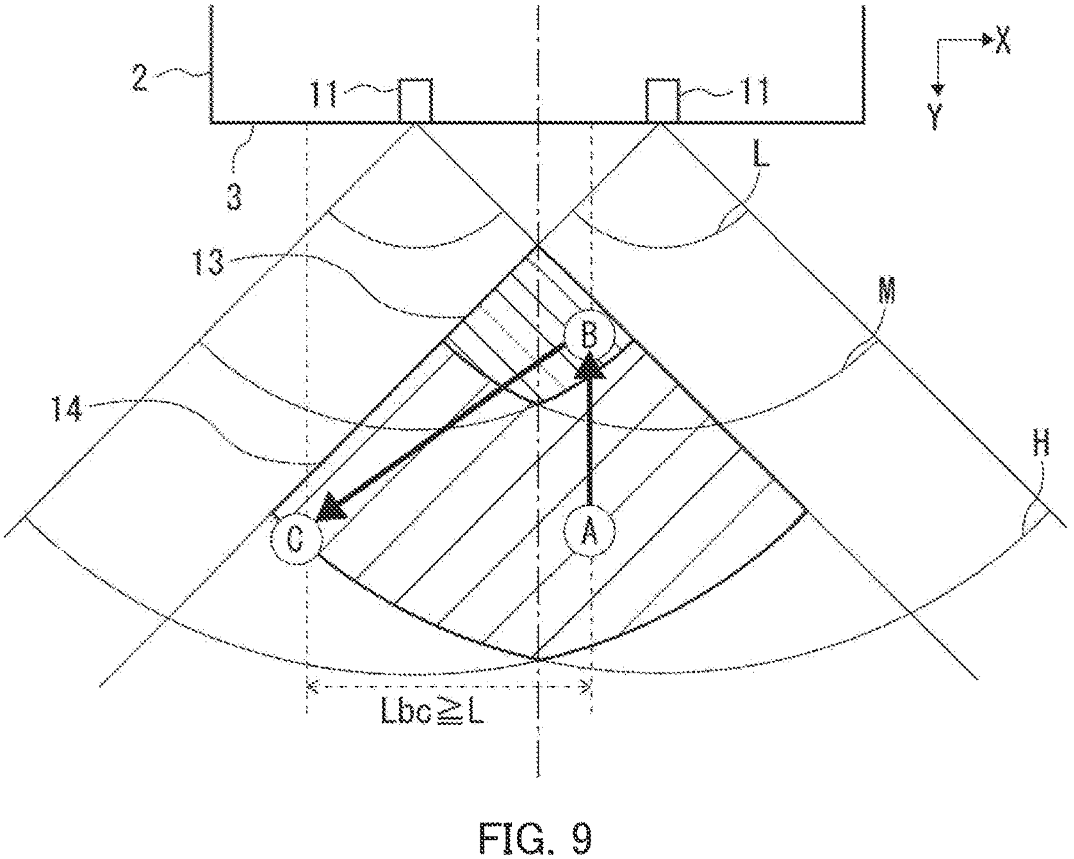
FIG. 9 is still another explanatory diagram illustrating the step motion that does not match with the permission pattern.

FIG. 9 is an exemplarily step motion that does not match with the permission pattern when each motion distance of the entry motion and the exit motion is used as a condition of the permission pattern. In this example, entry motion (B) from start region 14 to trigger region 13 is identified after entry motion (A) to start region 14 in the center mode is identified. Then, exit motion (C) from trigger region 13 to start region 14 is identified. In exit motion (C), length Lbc in the X direction from the start point of exit motion (C) (the end point of entry motion (B)) to the end point of exit motion (C) is longer than preset motion distance threshold value L. In this case, because the motion distance of the exit motion is long, the step motion does not match with the permission pattern. Such a step motion is considered as crossing behind rear side portion 3. Motion distance threshold value L may be any value at which the crossing motion behind rear side portion 3 can be determined.

Figure 10:
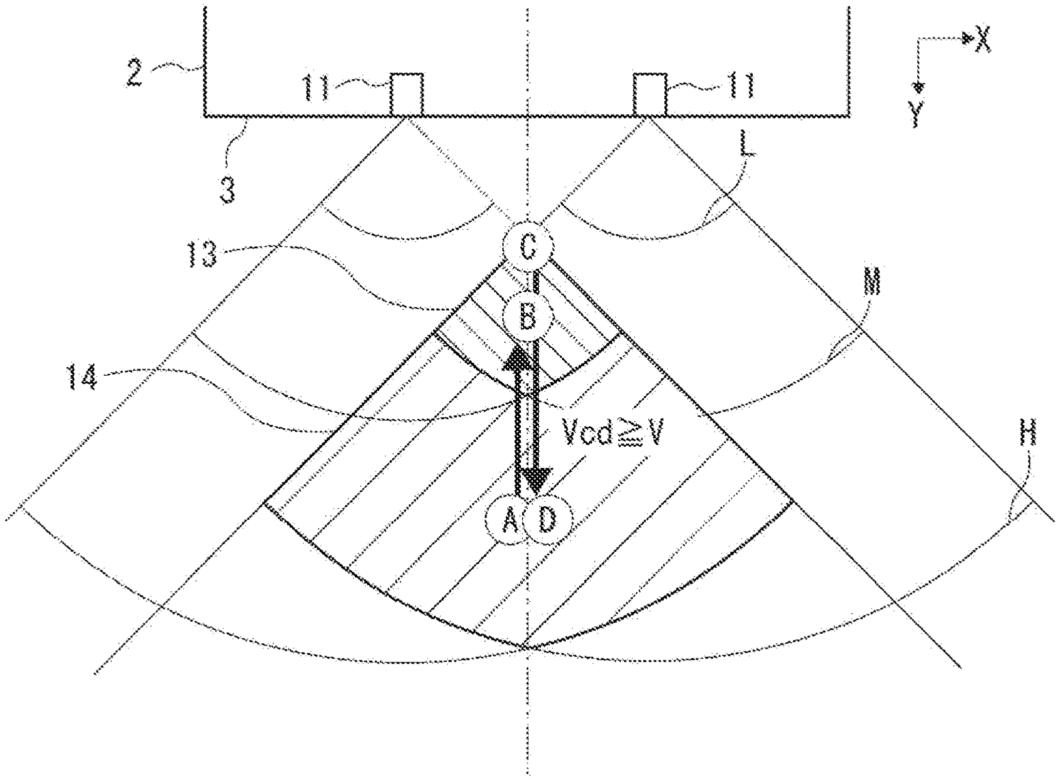
FIG. 10 is still another explanatory diagram illustrating the step motion that does not match with the permission pattern.

FIG. 10 is an exemplarily step motion that does not match with the permission pattern when each motion speed of the entry motion and the exit motion is used as a condition of the permission pattern. In this example, entry motion (B) from start region 14 to trigger region 13 is identified after entry motion (A) to start region 14 in the center mode is identified. Then, after standby operation (C) in the trigger region 13 is identified, exit operation (D) from trigger region 13 to start region 14 is identified. In exit motion (D), motion speed Vcd from the start point of exit motion (D) (the end point of standby motion (C)) to the end point of exit motion (D) is equal to or higher than preset motion speed threshold value V. In this case, because the motion speed of the exit motion is fast, the step motion does not match with the permission pattern. Such a step motion is considered as a case where, when the operator throws a package, the movement of the package is lost after being detected as entry motion (B) and standby motion (C), and the operator is detected as exit motion (D). It is also considerable that the small animal goes under vehicle 2 from the rear side of vehicle 2 toward the front side during the work of the operator. Motion speed threshold value V is set to a speed higher than the average motion speed when the permission pattern is satisfied.

Figure 11:
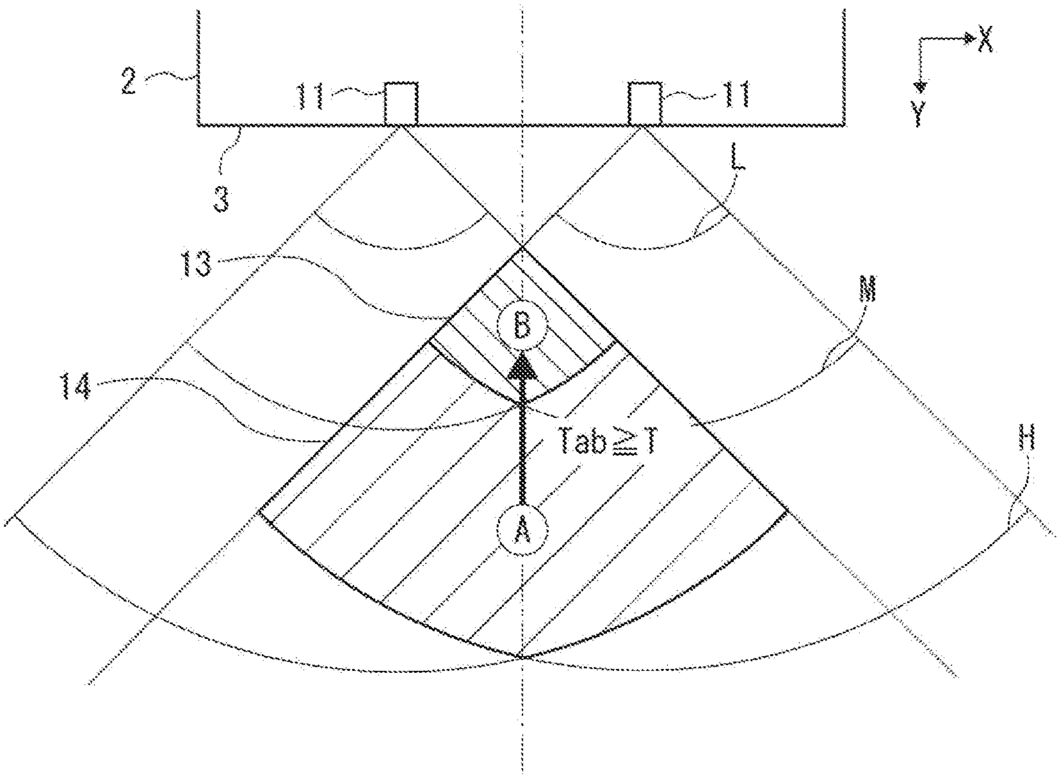
FIG. 11 is still another explanatory diagram illustrating the step motion that does not match with the permission pattern.

FIG. 11 is an exemplarily step motion that does not match with the permission pattern when each motion time of the entry motion and the exit motion is used as a condition of the permission pattern. In this example, entry motion (B) from start region 14 to trigger region 13 is identified after entry motion (A) to start region 14 in the center mode is identified. In entry motion (B), motion time Tab spent to move from the start point to the end point is equal to or more than motion time threshold value T. In this case, because the motion time of entry motion (B) is slow, the step motion does not match with the permission pattern. Such a step motion can be determined to have no intention to open or close tailgate 1. Similarly to standby time threshold value t, motion time threshold value T may be a time period in which the intention to open and close tailgate 1 can be confirmed.

In a case where the operation of locking device 5 is used as a condition of the permission pattern, when the locking state of locking device 5 is changed during the identification of the step motion, the checking of the step motion with the permission pattern is stopped. The case where the locking state of locking device 5 is changed is a case where tailgate 1 is manually opened and closed, or a case where tailgate 1 is opened and closed by body control device 30 in response to the operation from the driver's seat. In such a case, it is desired that the opening and closing of tailgate 1 by the step motion be not performed, and the checking of the step motion with the permission pattern be stopped.

When the step motion does not match with the permission pattern, it is required to restart the exit motion to start region 14 to restart the entry motion from start region 14 to trigger region 13. However, setting a large number of patterns in which the step motion as exemplified above does not match with the permission pattern is advantageous to prevent malfunction of tailgate 1.

When the step motion does not match with the permission pattern, it is desired that control device 12 execute control processing for causing notification device 6 to notify that the step motion does not match with the permission pattern. Thus, the operator can grasp the state of the operation of tailgate 1 in detail by causing notification device 6 to notify the three states: a state where the step motion partially matches with the permission pattern; a state where the step motion matches with the permission pattern; and a state where the step motion does not match with the permission pattern. However, the notification on the step motion not matching with the permission pattern by notification device 6 may be frequently performed when being performed on all patterns. Therefore, the pattern for notifying that the step motion does not match with the permission pattern may be limited to a pattern in which the exit motion from start region 14 is not identified for a predetermined time or longer after the exit motion from trigger region 13 to start region 14, a pattern in which the exit motion from trigger region 13 to the region further forward is identified after the entry motion from start region 14 to trigger region 13, or the like. The notification caused by crossing motion or the like behind rear side portion 3 may be rather troublesome, and is desired not to be performed.

As described above, according to the present embodiment, the entry motion to trigger region 13 and the exit motion to trigger region 13 are conveniently established by a motion of walking or stepping on a foot, or a motion of moving forward, backward, or the like of a walking frame, a walking assistance stick, or a wheelchair. Further, by combining the entry motion to trigger region 13 and the exit motion from trigger region 13, simple but intentional timing by the operator can be used as a signal of an opening and closing operation of tailgate 1. Therefore, according to the present embodiment, the tailgate can be opened and closed at a timing intended by the operator with a simple operation.

Further, according to the present embodiment, placing measurement device 11 in rear side portion 3 at the position lower than the lower end of tailgate 1 allows measurement device 11 to perform measurement regardless of the opening and closing of tailgate 1. This makes it possible to perform both opening and closing of tailgate 1 by the step motion of one pattern, which is advantageous to enhance the operability of opening and closing tailgate 1. Further, it is also possible to stop the opening and closing operation of tailgate 1 during the opening and closing of tailgate 1, which further enhances convenience.

Further, according to the present embodiment, the entry motion and the exit motion are operations that even a person who has difficulty in motions such as walking and stepping on a foot (e.g., wheelchair user) can perform. Therefore, the operation of opening and closing tailgate 1 does not require the operator to take an unstable posture and does not require a motion of greatly moving to the outside of the capturing range of the camera. Thus, the motion can be a barrier-free motion. When tailgate 1 is manually opened and closed, the operator performs an operation of approaching tailgate 1 and an operation of leaving tailgate 1. The entry motion and the exit motion are operations similar to those performed when tailgate 1 is manually opened and closed. Therefore, incorporating the motion similar to the motion performed when tailgate 1 is manually opened and closed can avoid complexity of the step motion and can reduce the troublesomeness caused by the step motion.

In the present embodiment, the notification by notification device 6 can appropriately provide the progress status of the step motion when the step motion partially matches with the permission pattern or the step motion completely matches with the permission pattern in the data processing being executed. For example, in a case where there is no intention to open or close tailgate 1, even when the motion behind rear side portion 3 partially matches with the permission pattern, it is possible to take measures not to open and close tailgate 1 by the motion that does not match with the permission pattern. In addition, in a case where there is an intention to open and close tailgate 1, using the notification by notification device 6 as a signal is advantageous to avoid a situation in which the step motion not matching with the permission pattern is repeated.

The embodiment of the present disclosure has been described above, but the tailgate opening and closing system and the opening and closing method of the present disclosure are not limited to the specific embodiment, and various modifications and changes can be made within the scope of the present disclosure.

Measurement device 11 can also be configured with a single distance meter. When measurement device 11 is configured with a single distance meter, trigger region 13 is a region of a measurement range that forms an annular sector shape having short distance L or greater and less than middle distance M of the single distance meter. Further, start region 14 is a region of a measurement range that forms an annular sector shape having middle distance M or greater and long distance H or less. In addition, measurement device 11 can be configured with two or more than two distance meters. For example, when measurement device 11 is configured with three distance meters, the measurement ranges of the distance meter placed on the left and right sides and the measurement range of the distance meter placed in the center may overlap with each other. Note that the measurement ranges of the distance meters on the left and right sides need not overlap with each other.

A hysteresis region may be provided between trigger region 13 and start region 14. The hysteresis region is a region in which the distance data measured in the region is not used for data processing. Providing the hysteresis region widen the boundary between trigger region 13 and start region 14 and requires the entry motion from start region 14 to trigger region 13 and the exit motion from trigger region 13 to the start region 14 to be clearer motions, but can avoid erroneously identifying the motion.

Trigger region 13 and start region 14 can be spaced farther away from rear side portion 3 by increasing the length between the two distance meters in the X direction or by increasing each measurement range of the distance meters. On the other hand, trigger region 13 and start region 14 can be spaced closer to rear side portion 3 by shortening the length between the two distance meters in the X direction or by narrowing each measurement range of the distance meters. That is, it is possible to configure a more appropriate region by the operator of vehicle 2.

The invention claimed is:

1. A tailgate opening and closing system including a control device for controlling an opening and closing device that opens and closes a tailgate placed in a rear side portion of a vehicle, the tailgate opening and closing system comprising:

a measurement device that is placed in the rear side portion and at a position lower than the tailgate in a closed state and sequentially obtains distance data to an object present behind the rear side portion, wherein the measurement device comprises a plurality of distance meters arranged in a vehicle width direction, the control device is configured to select one mode from a plurality of modes, the plurality of modes including at least a first mode and a second mode, wherein in the first mode a trigger region and a start region set in a region apart from the rear side portion within a measurement range of the measurement device are arranged in a vehicle longitudinal direction, and in the second mode the trigger region and the start region are arranged in a vehicle width direction, when difference between each of the distance data obtained by the respective distance meters is within a predetermined range, switch the mode to the first mode, and when the difference is outside the predetermined range, switch the mode to the second mode, execute, based on the selected mode, a data processing process of identifying an entry motion of the object from the start region to the trigger region and an exit motion of the object from the trigger region to the start region based on a plurality of the distance data which are continuous and which have been obtained by the measurement device, and execute control processing process of opening and closing the tailgate by the opening and closing device based on a combination of the entry motion and the exit motion that have been identified.

2. The tailgate opening and closing system according to claim 1, wherein the combination of the entry motion and the exit motion is a step motion by a foot of an operator when the object is the foot of the operator present behind the rear side portion.

3. The tailgate opening and closing system according to claim 1, wherein, in the executed control processing process, any of an opening operation, a closing operation, and stopping of the opening and closing operations of the tailgate is performed in accordance with an opening and closing state of the tailgate before the execution of the control processing.

4. The tailgate opening and closing system according to claim 1, wherein the control processing is executed when the combination matches with a permission pattern that uses an identified order of the entry motion and the exit motion as a condition.

5. The tailgate opening and closing system according to claim 4, wherein the permission pattern uses a waiting time of the object in the trigger region as a condition in addition to the order, and the permission pattern is not satisfied by a case where the waiting time is equal to or more than a waiting time threshold value.

6. The tailgate opening and closing system according to claim 4, wherein, in the data processing process being executed, when the combination partially matches with the permission pattern, the control device executes control processing of notifying, by a notification device placed in the tailgate or the rear side portion, that the combination partially matches with the permission pattern.

7. The tailgate opening and closing system according to claim 1, wherein the second mode is a mode in which the start region and the trigger region are arranged in this order from right to left in a vehicle front direction, and the plurality of modes further includes a third mode in which the start region and the trigger region are arranged in this order from left to right in the vehicle front direction.

8. The tailgate opening and closing system according to claim 1, wherein the control device identifies an entry motion to the trigger region when the object moves from the start region to the trigger region.

9. A tailgate opening and closing system including a control device for controlling an opening and closing device that opens and closes a tailgate placed in a rear side portion of a vehicle, the tailgate opening and closing system comprising:

a measurement device that is placed in the rear side portion and at a position lower than the tailgate in a closed state and sequentially obtains distance data to an object present behind the rear side portion, wherein the measurement device comprises a plurality of distance meters arranged in a vehicle width direction, the control device is configured to select one mode from a plurality of modes, the plurality of modes including at least a first mode and a second mode, wherein in the first mode a trigger region and a start region set in a region apart from the rear side portion within a measurement range of the measurement device are arranged in a vehicle longitudinal direction, and in the second mode the trigger region and the start region are arranged in a vehicle width direction, determine whether the object is in a still state or a motion state based on the respective distance data obtained by the respective distance meters, and switch to the second mode when the object is in the still state, execute, based on the selected mode, a data processing process of identifying an entry motion of the object from the start region to the trigger region and an exit motion of the object from the trigger region to the start region based on a plurality of the distance data which are continuous and which have been obtained by the measurement device, and execute control processing process of opening and closing the tailgate by the opening and closing device based on a combination of the entry motion and the exit motion that have been identified.

* * * * *